United States Patent [19]

Saj

[11] 3,961,780

[45] June 8, 1976

[54] PRECISION ROTARY INDEXING FIXTURE

[75] Inventor: Joseph J. Saj, Detroit, Mich.

[73] Assignee: U.S. Industries, Inc., Ferndale, Mich.

[22] Filed: Mar. 19, 1975

[21] Appl. No.: 559,659

[52] U.S. Cl. ............................................. 269/64
[51] Int. Cl.² ........................................ B23Q 3/18
[58] Field of Search ................ 269/57, 63, 65, 59, 269/64; 51/216 ND, 216 H; 74/813 R

[56] References Cited
UNITED STATES PATENTS

| | | | |
|---|---|---|---|
| 2,339,986 | 1/1944 | Engert | 269/63 |
| 2,686,283 | 8/1954 | Stephan | 51/216 ND |
| 2,921,487 | 1/1960 | Schabot | 269/65 |
| 2,973,956 | 3/1961 | Hartley | 269/57 |
| 3,048,948 | 8/1962 | Johnson | 51/216 ND |

Primary Examiner—Al Lawrence Smith
Assistant Examiner—Robert C. Watson
Attorney, Agent, or Firm—Barnes, Kisselle, Raisch & Choate

[57] ABSTRACT

A precision rotary indexing fixture wherein a work support plate is rotatably journalled on a base. The plate and base each have a downwardly facing ring of teeth thereon. An axially movable coupling ring has two rings of teeth thereon which register axially and are adapted to mesh with the rings of teeth on the plate and base to fixedly retain the plate in a predetermined angular position relative to the base. The number of teeth in the two sets of rings may differ and the coupling ring may be rotated through a predetermined arcuate extent to obtain vernier angular adjustment of the top plate relative to the base through an arcuate extent of a fraction of the spacing between the successive teeth on either of the rings.

15 Claims, 5 Drawing Figures

PRECISION ROTARY INDEXING FIXTURE

This invention relates to an indexing device, and, more particularly, to a rotary indexing fixture on which a workpiece is adapted to be supported and rotated through a very precise arcuate dimension.

The present invention is an improvement over the type of indexing fixture disclosed in U.S. Pat. No. 2,921,487, dated Jan. 19, 1960. In their simplest form devices of the type shown in the patent referred to consist of two serrated tooth plates having the same number of teeth of such shape that one plate can be tightly engaged with the other plate. When the teeth are meshed the plates cannot rotate with respect to each other. However, the angular position of the two plates can be changed by lifting the top plate with respect to the other, rotating the top plate, and, thereafter, re-engaging the teeth to position the top plate in a predetermined angular relation relative to the bottom plate.

Devices of the above described type are very useful for rotating workpieces that are being machined or inspected into discrete positions and retaining them firmly in the position selected. For example, if the two plates each have 360 teeth, the top plate can be rotated to allow positioning of a workpiece thereon in any of 360 possible positions.

In some applications of such indexing fixtures it is undesirable or even unacceptable to permit axial movement necessary between the two plates to allow one to rotate relative to the other. One solution to this problem is the provision of an additional rotary member supported on independent bearings, the additional rotary member being coupled to the two toothed plates for axial sliding movement. However, the additional coupling and required bearings are expensive to produce for extreme accuracy and, furthermore, generally result in a fixture which is not as rigid or accurate as is desired in such applications.

The object of the present invention is to provide an indexing fixture of the type described which does not require axial movement of the work-supporting member, but which at the same time retains the rigidity and accuracy required of such fixtures.

A further object of the present invention resides in a fixture of the above described type which enables positioning of the work-supporting plate in a vernier fashion relative to the other plate so that the positions obtainable far exceed the number of intermeshing teeth on the two plates.

Other objects and features of the present invention will become apparent from the following description and accompanying drawings; in which.

Figure 1:
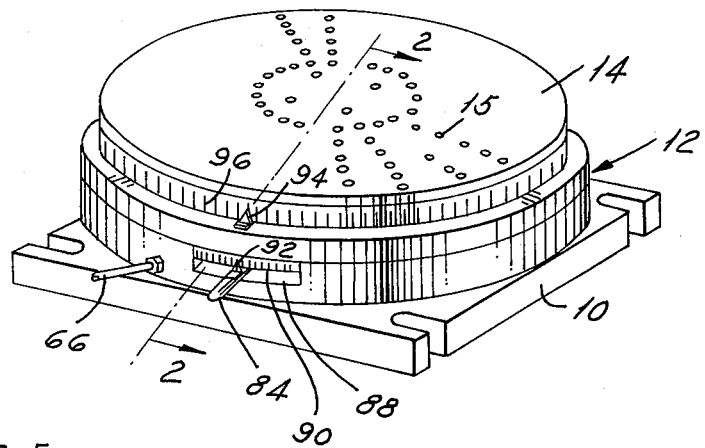
FIG. 1 is a perspective view of a rotary indexing fixture according to the present invention.
Figure 2:
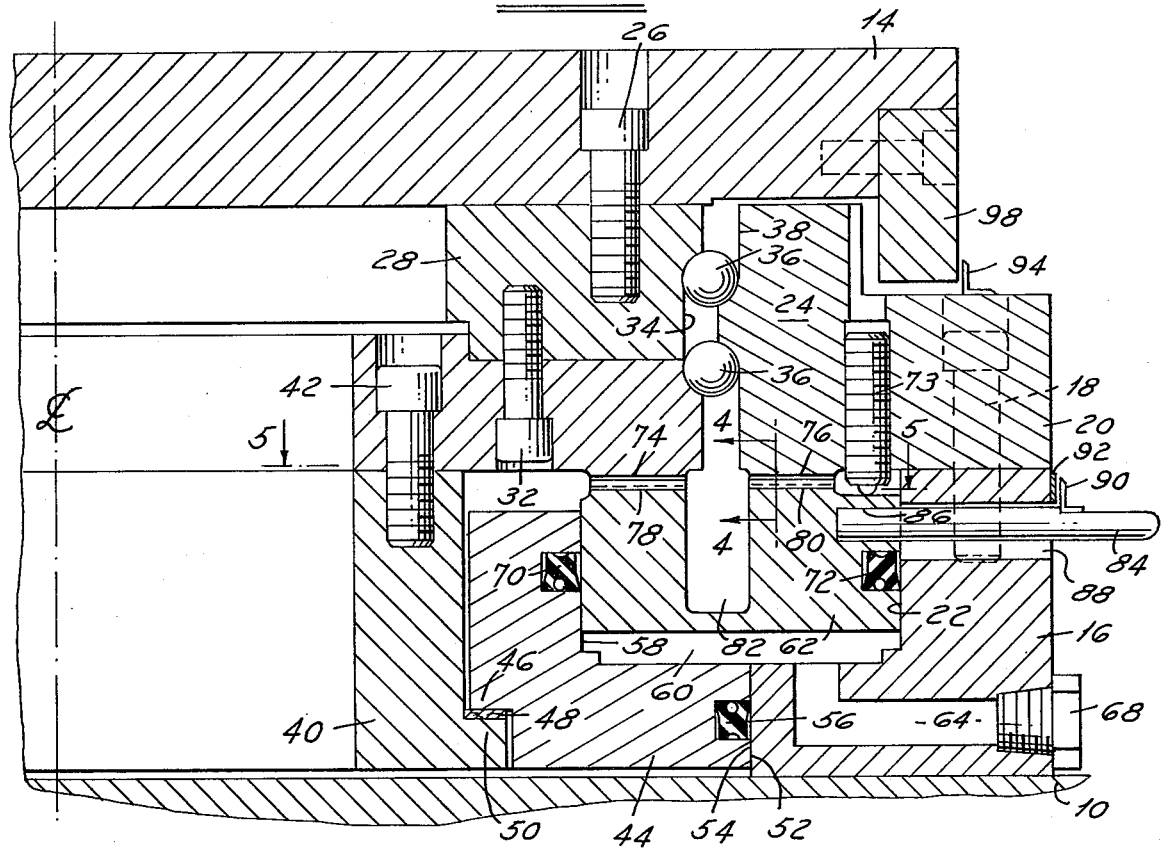
FIG. 2 is a vertical sectional view along the line 2—2 in FIG. 1 with the toothed members of the fixture engaged.

In FIG. 1 the indexing fixture is illustrated with a base plate 10 which is adapted to be supported on any suitable support such as the table of a machine tool. A rigid support ring 12 is fixedly secured to base plate 10 and a work support plate 14 is journalled for rotation on support ring 12 in a horizontal plane. Plate 14 is preferably provided with a plurality of threaded openings 15 therein to facilitate clamping a workpiece thereon. As shown in FIG. 2, support ring 12 includes a bottom retainer ring 16 on which is secured (as by screws 18) an upper ring 20. The inner periphery of the upper portion of ring 16 is the cylindrical surface designated 22. Upper ring 20 extends radially inwardly of the cylindrical surface 22 of ring 16, as indicated at 24. The top support plate 14 has mounted on the underside thereof, as by screws 26, an upper bearing race ring 28. A lower bearing race ring 30 is secured to the underside of ring 28 as by screws 32. Around the outer periphery of rings 28, 30 there is machined a race 34 for bearing balls 36. Around the inner periphery of the portion 24 of ring 20 there is machined a bearing race 38. Bearing balls 36 cooperate with these two races to provide a rotary thrust bearing by means of which top plate 14 is supported for rotation on support ring 12 in a precise horizontal plane. An inner retainer ring 40 is mounted in a depending fashion from ring 30 as by screws 42. Thus, in the arrangement illustrated rings 16, 20 are fixed relative to base plate 10 and rings 28, 30, 40 are fixed relative to and rotate with top plate 14.

A floating ring 44 is arranged between retainer rings 16, 40. Ring 44 is supported by a shoulder 46 thereon which rests upon a bearing 48 on a radially outwardly extending shoulder 50 on ring 44. The outer periphery 52 of the lower portion of ring 44 and the inner periphery 54 of the lower portion of ring 16 are machined accurately concentric to the bearing races previously described. Ring 44 has a close fit within ring 16 and is sealed relative thereto as at 56. The inner periphery of the upper portion of bottom retainer ring 16 which is defined by the surface 22 and the outer periphery of ring 44 which is defined by the cylindrical surface 58 define an annular cylinder 60 in which an annular piston 62 is vertically shiftable. Cylinder 60 is adapted to be connected to a source of air or oil under pressure by a passageway 64 extending to the outer periphery of base ring 16. A conduit 66 is adapted to be connected to passageway 64 by means of a fitting 68. Piston 62 is sealed within cylinder 60 as by seals 70, 72 and is biased downwardly therein by a plurality of spring plungers 73.

Figure 4:
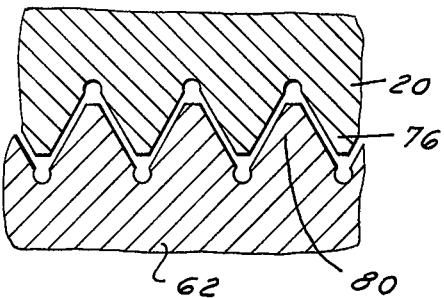
FIG. 4 is a fragmentary sectional view along the line 4—4 of FIG. 2.
Figure 3:
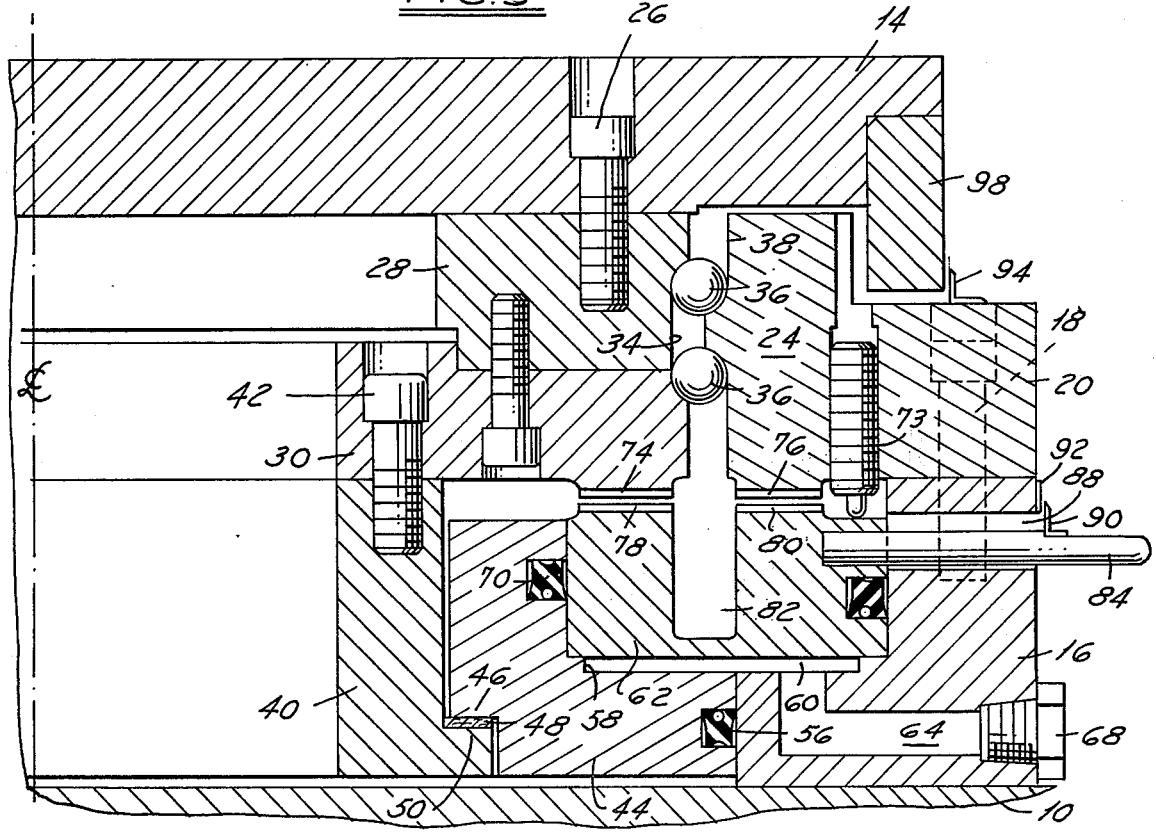
FIG. 3 is a view similar to FIG. 2 with the toothed members disengaged.

The portion of the bottom face of ring 30 which overlies cylinder 60 has machined thereon a narrow ring of accurately formed teeth 74. Likewise, the portion of the bottom face of ring 20 which overlies cylinder 60 has machined thereon a narrow ring of accurately formed teeth 76. The teeth 74, 76 are accurately uniformly spaced and are preferably generally triangular in cross section, as indicated in FIG. 4. The upper face of piston 62 is formed with two narrow rings of teeth thereon, the teeth in the inner ring being designated 78 and the teeth in the outer ring being designated 80. Teeth 78 correspond in shape and spacing with teeth 74 and teeth 80 correspond in shape and spacing with teeth 76. Between the two rings of teeth 78, 80 piston 62 is preferably formed with a groove 82 extending downwardly from the top face thereof to almost the bottom wall of the piston. Groove 82 has a depth preferably greater than at least three-quarters of the thickness of piston 62 so that the radially inner and radially outer sections of piston 62 can flex relative to one another. It will be appreciated that when air or oil under pressure is applied to passageway 64 piston 62 is shifted upwardly against the bias of spring plungers 73 to the position shown in FIG. 2 so that teeth 78 mesh with teeth 74 and teeth 80 mesh with teeth 76. In this position piston 62 provides a rigid coupling between rings 20, 30 and thus firmly retains top plate 14 in a rotatively fixed position relative to base plate 10. When the pressure in passageway 64 (and, consequently, the lower end of cylinder 60) is relieved, piston 62 moves downwardly under the influence of its own weight and the biasing action of plungers 73 to the position shown in FIG. 3 where teeth 78, 80 disengage from teeth 74, 76, respectively. With the teeth thus disengaged, top plate 14 can be rotated relative to base ring 16.

Figure 5:
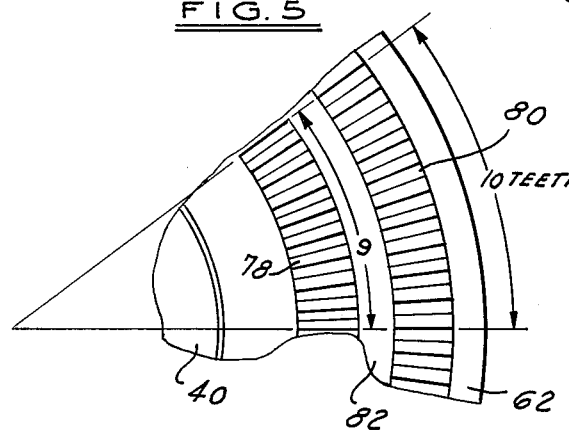
FIG. 5 is a fragmentary sectional view along the line 5—5 in FIG. 2.

It is clear that teeth 74 must correspond in number with teeth 78 and that teeth 76 must correspond in number with teeth 80. However, it is not essential that the teeth in the inner ring correspond in number with the teeth in the outer ring. For example, if teeth 74, 78 are 360 in number and teeth 76, 80 are 400 in number, the two sets of teeth will still mesh. Then, if independent means are provided for rotating the coupling piston 62 over a range of about 10 teeth, the fixture can be used in the manner of a vernier where combinations of rotation of ring 30 and piston 62 will allow for 3600 possible angular positions of top plate 14 relative to base plate 10. This particular ratio between the number of teeth 78 and the number of teeth 80 is shown in FIG. 5. Nine teeth 78 are included in the same arcuate extent as ten teeth 80. Thus, if the successive teeth 78 are spaced apart 1°, then the successive teeth 80 are spaced apart 9/10°. Similarly, if teeth 78 number 360 and teeth 80 number 432, 2160 possible angular positions of top plate 14 relative to base plate 10 are possible. Obviously, many other combinations of the number of teeth on the inner and outer rings are possible to obtain the desired number of possible angular positions of top plate 14 relative to base plate 10.

In the fixture illustrated the means for independently rotating piston 62 comprises a handle 84 connected to piston 62 as at 86 and extending through a radially extending slot 88 in bottom retainer ring 16. The arcuate extent of slot 88 depends upon the relative numbers of teeth in the inner and outer toothed rings. In the event there are 360 teeth 78 and 400 teeth 80, then the arcuate extent of slot 88 is such that piston 62 can be rotated through an arc of about ten teeth. The extent to which piston 62 is rotated can be determined by an indicator 90 on handle 84 and a circular scale 92 on retainer ring 16 which cooperates with indicator 90. The spacing between the indicator marks on scale 92 would correspond to the spacing between successive teeth 80. Likewise, the extent of rotation of top plate 14 relative to base plate 10 is determined by an indicator 94 which cooperates with the scale 96 formed on the depending skirt 98 around the outer periphery of top plate 14. The spacing between the indicator marks on scale 96 correspond to the spacing between successive teeth 78. Thus, if teeth 78 equal 360 in number and teeth 80 equal 400 in number, as pointed out above, top plate 14 can be adjusted to 3600 angular positions relative to base plate 10. For example, if it is desired to move top plate 14 through an arc of 1 1/10°, piston 62 would first be retracted to disengage the meshing teeth. Thereafter, top plate 14 would be rotated through 1° in one direction and piston 62 would be rotated through handle 84 through one step on indicator scale 92 in the opposite direction; that is, 9/10°. Then, when a pressure fluid is again directed to cylinder 60, the flat inclined faces of teeth 78, in moving into meshing relationship with the flat inclined faces of teeth 74, would shift ring 30 slightly (1/10°) so that when both sets of teeth have meshed top plate 14 will be locked in a position rotated 1 1/10° from its previous setting. In this connection it will be appreciated that any suitable means (such as a pinion or the like) may be employed in place of handle 84 to rotate piston 62 a desired extent.

It will be appreciated that the accuracy of the angular positioning of top plate 14 depends upon the accuracy to which the teeth in the two sets of rings are formed and also upon the ability of the flat inclined faces of the teeth in the two sets of rings to mesh perfectly. Unless the teeth of both rings mesh perfectly, precise positioning will not be achieved and the required extreme accuracy of the indexing operation would not result. The perfect meshing of the teeth is assured not only by weakening piston 62 (as by groove 82), but also by the interengagement of shoulders 46, 50. Ring 44 serves as a re-action member, which, when pressure is applied to cylinder 60, applies downward force on ring 40 and thus tends to draw the teeth 74 on ring 30 downwardly into perfect meshing engagement with teeth 78. Thus, the combined effect of groove 82 and ring 44 compensates for any infinitesimal misalignment of the teeth without adversely affecting the rigidity of the overall structure.

I claim:

1. A precision rotary indexing fixture for workpieces, comprising: a base; a plate having a support face on which a workpiece is adapted to be mounted, said plate being journalled on said base for rotation about an axis extending transversely to the plane of said support face; means connecting said plate and base for preventing relative movement thereof along said axis; a first narrow ring of accurately formed teeth on said support plate, said teeth being spaced uniformly apart and concentrically about said axis; a second narrow ring of accurately formed teeth on said base, said last mentioned teeth being spaced apart uniformly and accurately concentric with said first ring of teeth, said two rings of teeth facing in the same direction; a coupling member on said base having two sets of accurately formed teeth thereon which are aligned with the first and second rings of teeth respectively; the teeth of one set on said coupling member being spaced apart to correspond with the spacing of the teeth on said support plate and the teeth of the other set on said coupling member being spaced apart to correspond with the spacing of the teeth on said base, said coupling member being movable on said base to shift said two sets of teeth toward and away from the rings of teeth on the support plate and base whereby to mesh with the latter teeth and thereby retain said top plate and base against relative rotary movement; and means for moving said coupling member to bring said teeth into and out of said meshing engagement.

2. A rotary indexing fixture as called for in claim 1 wherein the two sets of teeth on said coupling member comprise two concentric rings of teeth.

3. A rotary indexing fixture as called for in claim 1 wherein the first ring of teeth and the second ring of teeth lie in planes which are perpendicular to said axis.

4. A rotary indexing fixture as called for in claim 3 wherein said first ring of teeth are spaced radially inwardly from said second ring of teeth.

5. A rotary indexing fixture as called for in claim 4 wherein the two sets of teeth on said coupling member face towards the support face of said plate.

6. A rotary indexing fixture as called for in claim 1 wherein the number of teeth on said first ring differs from the number of teeth on said second ring.

7. A rotary indexing fixture as called for in claim 6 including means for rotating said coupling member through a predetermined arcuate distance about said axis.

8. A rotary indexing fixture as called for in claim 1 wherein said coupling member comprises a piston and including means on said base forming a cylinder for said piston to allow the coupling member to move toward and away from the teeth on said top plate and base.

9. A rotary indexing fixture as called for in claim 8 wherein the coupling member is movable vertically on said base, the two sets of teeth on said coupling member being formed on the top face thereof and including means for directing fluid under pressure into said cylinder against the bottom face of said annular member.

10. A rotary indexing fixture as called for in claim 1 including means on said coupling member forming a line of weakening between the two sets of teeth thereon whereby to impart flexibility to the coupling member in the plane of said teeth.

11. A rotary indexing fixture as called for in claim 1 including means defining a groove between the two sets of teeth on said coupling member, said groove having a depth greater than the depth of the teeth on the coupling member and greater than about three-fourths of the thickness of the coupling member so as to impart flexibility to said coupling member in the plane of the teeth thereon.

12. A rotary indexing fixture as called for in claim 1 wherein said coupling member comprises a ring and including an annular member engaging the inner periphery of the coupling member and having a portion underlying the coupling member, said annular member comprising a re-action member which is urged in a direction away from the coupling member when the coupling member is shifted to interengage the teeth thereon with the teeth on said base and plate, said annular member having means thereon for urging the teeth on said plate into meshing engagement with the corresponding ring of teeth on the coupling member when the coupling member is moved toward the teeth on said plate and base.

13. A rotary indexing fixture as called for in claim 1 including means on said base normally biasing said coupling member axially away from the teeth on said plate and base.

14. A rotary indexing fixture as called for in claim 1 wherein the number of teeth on said first and second rings are different and including means for rotating said coupling member through an arc of predetermined length, indicia means for indicating the relative extent of rotation of said plate relative to said base and further indicia means for indicating the extent of relative rotation between said coupling member and said base.

15. A rotary indexing fixture as called for in claim 14 wherein the number of teeth on said first ring is greater than the number of teeth on the second ring.

* * * * *